(12) United States Patent
Cheng et al.

(10) Patent No.: US 11,353,904 B2
(45) Date of Patent: Jun. 7, 2022

(54) MULTI-SLOPE STARTUP VOLTAGE REGULATOR SYSTEM

(71) Applicant: TEXAS INSTRUMENTS INCORPORATED, Dallas, TX (US)

(72) Inventors: Kuang-Yao Cheng, Bedford, NH (US); Wenkai Wu, East Greenwich, RI (US); Preetam Tadeparthy, Bangalore (IN); Shuhua Zhang, Westford, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/399,341

(22) Filed: Apr. 30, 2019

(65) Prior Publication Data
US 2020/0348706 A1 Nov. 5, 2020

(51) Int. Cl.
*G05F 1/575* (2006.01)
*H02M 3/158* (2006.01)
*H02M 1/00* (2006.01)

(52) U.S. Cl.
CPC ............ *G05F 1/575* (2013.01); *H02M 3/158* (2013.01); *H02M 1/0009* (2021.05)

(58) Field of Classification Search
CPC .......... H02M 3/158; H02M 2001/0009; G05F 1/575
See application file for complete search history.

(56) References Cited

U.S. PATENT DOCUMENTS

| | | | |
|---|---|---|---|
| 2009/0261797 A1* | 10/2009 | Shibata | H02M 3/1588 323/288 |
| 2013/0063105 A1* | 3/2013 | Nishida | H02M 3/156 323/271 |
| 2013/0307501 A1* | 11/2013 | Kadanka | G05F 1/56 323/274 |
| 2015/0102794 A1* | 4/2015 | Fan | H02M 3/1588 323/283 |
| 2016/0156262 A1* | 6/2016 | Kelly | G05B 13/044 323/285 |
| 2018/0316271 A1* | 11/2018 | Yu | H02M 3/33515 |
| 2019/0165676 A1* | 5/2019 | Nogawa | H02M 3/157 |
| 2019/0271998 A1* | 9/2019 | Sisson | G05F 1/468 |
| 2019/0317141 A1* | 10/2019 | Karlsson | H02M 3/33592 |
| 2020/0136516 A1* | 4/2020 | Chesneau | H02M 3/1588 |

* cited by examiner

*Primary Examiner* — Thienvu V Tran
*Assistant Examiner* — Bart Iliya
(74) *Attorney, Agent, or Firm* — Valerie M. Davis; Charles A. Brill; Frank D. Cimino (57) ABSTRACT

A voltage regulator system includes a switch system including a power switch to conduct an output current through an inductor based on an input voltage and a switching signal to generate an output voltage at a load. A feedback system generates a PWM signal based on the output voltage and based on a variable reference voltage. A gate driver system generates the switching signal based on the PWM signal. The gate driver system controls the switch system to increase the output voltage at output voltage slopes in each of startup stages during startup of the voltage regulator system. A sampling system samples the output current and the output voltage during the startup of the voltage regulator system to measure each slope of the output voltage slopes at each of the respective startup stages during the startup of the voltage regulator system.

17 Claims, 10 Drawing Sheets

MULTI-SLOPE STARTUP VOLTAGE REGULATOR SYSTEM

TECHNICAL FIELD

This disclosure relates generally to electronic systems, and more specifically to a multi-slope startup voltage regulator system.

BACKGROUND

Power supply circuits can be implemented in a variety of different ways. Examples of power supply circuits include synchronous rectifier power converters, asynchronous rectifier power converters, resonant power converters, and any of a variety of other types of switching power converters. Power supply circuits can be configured as voltage regulators that provide an output voltage of a predetermined amplitude to a load. Load transient performance can be important for voltage regulators, so loop compensation designs, such as including output inductor and capacitor selection, can be carefully performed during the design process with reasonable margins. The loop compensation designs can be based on the output load and capacitance. However, the load types can vary for some voltage regulators, and can have unpredictable amplitudes. As another example, memory systems can include different modules (e.g., dual inline memory modules (DIMMs)), which can have different capacitances. As a result, the voltage regulator designs may not be able to be optimized for all different types of DIMMs, but can only be designed to consider a worst-case scenario load, which could result in an over-design of the voltage regulator.

SUMMARY

One example includes a voltage regulator system. The system includes a switch system including a power switch to conduct an output current through an inductor based on an input voltage and a switching signal to generate an output voltage at a load. A feedback system generates a PWM signal based on the output voltage and based on a variable reference voltage. A gate driver system generates the switching signal based on the PWM signal. The gate driver system controls the switch system to increase the output voltage at output voltage slopes in each of startup stages during startup of the voltage regulator system. A sampling system samples the output current and the output voltage during the startup of the voltage regulator system to measure each slope of the output voltage slopes at each of the respective startup stages during the startup of the voltage regulator system.

Another example includes a method for starting a voltage regulator system. The method includes providing a reference voltage to a feedback stage of the voltage regulator system. The reference voltage can linearly increase in each of reference voltage slopes in each of respective startup stages. The feedback stage can be configured to generate a PWM signal based on an output voltage provided to a load of the voltage regulator system and based on the variable reference voltage. The method also includes providing the PWM signal to a switching system configured to generate at least one switching signal based on an amplitude of the PWM signal to generate an output current through an inductor. The output current can generate the output voltage at each of output voltage slopes in each of the respective startup stages. The method also includes sampling the output current and the output voltage to measure each slope of the output voltage slopes at each of the respective startup stages. The method further includes calculating a capacitance associated with an output capacitor to determine capacitor aging associated with the output capacitor.

Another example includes an integrated circuit (IC) chip comprising a voltage regulator system. The voltage regulator system includes a voltage source comprising a first output and a switch system coupled to the first output and a second output and comprising a third output. The system also includes an output stage coupled to the third output and comprising a fourth output and an output capacitor coupled to the fourth output. The system also includes a feedback system coupled to the fourth output and comprising the second output, the feedback system being further coupled to an input adapted to be coupled to a variable reference voltage generator. The system further includes a multi-slope output voltage sampling system coupled to the fourth output and comprising a fifth output coupled to the switch system.

DETAILED DESCRIPTION

This disclosure relates generally to electronic circuits and systems, and more specifically to a multi-slope startup voltage regulator system. The multi-slope startup voltage regulator system (hereinafter also described as "voltage regulator system") can include a switch system that includes at least one power switch (e.g., a high-side switch and a low-side switch) that is controlled by at least one switching signal and based on an input voltage to conduct an output current through an inductor to generate an output voltage at an output terminal to which a load may be coupled. As an example, the load can correspond to a variable load, such that the load resistance can vary during startup of the voltage regulator system. As described herein, the term "startup" with respect to the voltage regulator system describes an initial power-up of the voltage regulator system, such that the output voltage increases from approximately zero volts to a maximum rated amplitude for subsequent normal operation of the voltage regulator system.

The voltage regulator system also includes a feedback system configured to generate a PWM signal based on the output voltage and based on a variable reference voltage. As an example, the variable reference voltage can correspond to a multi-slope reference voltage, such that during each of different startup stages, the variable reference voltage can have a different linear slope (e.g., having an increased slope in each successive startup stage). For example, the startup of the voltage regulator system can occur over a plurality of startup stages, such that the variable reference voltage increases at each of the reference voltage slopes until a final (e.g., maximum) constant amplitude of the reference voltage is achieved, such that startup of the voltage regulator system is complete, and normal operation of the voltage regulator system commences.

The voltage regulator system also includes a gate driver system configured to generate the at least one switching signal based on the PWM signal. The gate driver system can further be configured to control the switch system to increase the output voltage at output voltage slopes that increase in each startup stage during startup of the voltage regulator system. Therefore, the output voltage can increase with a different slope based on the variable reference voltage that changes during each of the separate respective startup stages of the voltage regulator system. In addition, as described herein, the transfer function of the gate driver system can be adjusted in response to detecting aging of the output capacitor(s) of the voltage regulator system to maintain a more efficient operation of the voltage regulator system over time.

As a further example, the voltage regulator system includes a sampling system configured to sample the output current and the output voltage during the startup of the voltage regulator system, such as during each of the respective startup stages during the startup of the voltage regulator system. For example, in each of the startup stages, the sampling system can measure the output current first to determine a time at which the output current has an approximately constant amplitude. As described herein, the term "approximately constant" with respect to the amplitude of the output current describes that the amplitude of the output current exhibits very little to no change, such as to remain within a predetermined threshold (e.g., within ±5% of a desired value) in each respective startup stage (e.g., as determined by the sampling system). Based on the relationship between the capacitance of the output capacitor(s), the output current, and the output voltage, an approximately constant amplitude of the output current is indicative of a linear increase of the output voltage. Therefore, in response to detecting an approximately constant amplitude of the output current, the sampling system can measure the output voltage at each of a plurality of sampling times (e.g., through an analog-to-digital converter (ADC)) to measure the slope of the output voltage. The sampling system can thus calculate a capacitance of the output capacitor(s) and/or the resistance of the load based on the slope measurements. As a result, the sampling system can modify the transfer function of the voltage regulator system accordingly based on the calculated capacitance and/or resistance, and/or can provide an indication of unacceptable aging of the output capacitor(s), as described herein.

Figure 1:
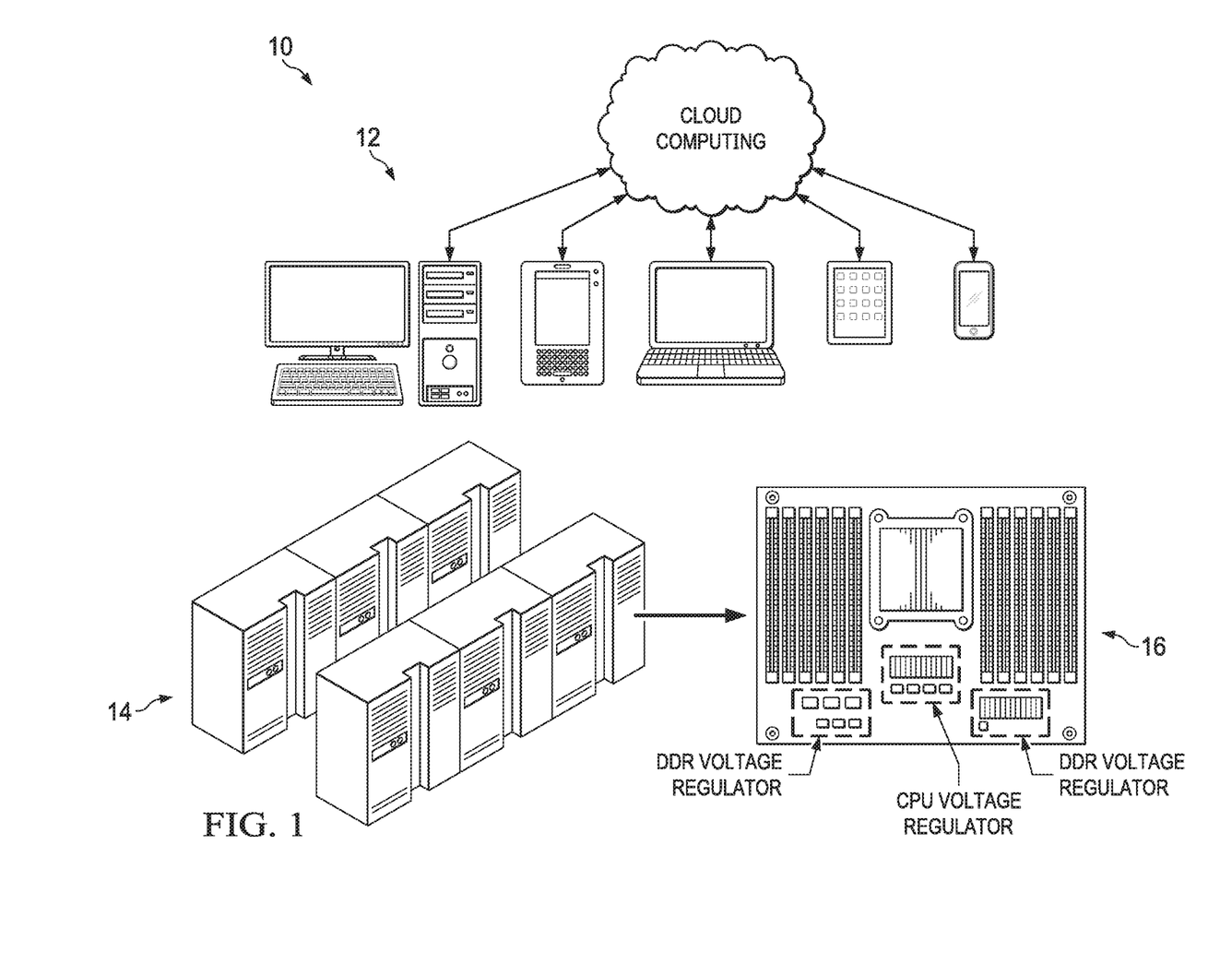
FIG. 1 illustrates an example of computer system.

FIG. 1 illustrates an example of computer systems 10. The computer systems 10 can correspond to any of a variety of computer systems, such as enterprise computer systems, desktop computers, laptop computers, tablet devices, handheld wireless communication devices, or any of a variety of computer or electronic device systems that can include voltage regulators. The example of FIG. 1 demonstrates that the computer systems 10 can be included in a cloud computing environment, demonstrated at 12, and depicts an example of multiple computer systems at 14. The computer systems 14 are illustrated as including multiple voltage regulators, including multiple double data rate (DDR) memory system voltage regulators (VRs) and a central processing unit (CPU) voltage regulator, demonstrated at 16. Therefore, FIG. 1 demonstrates the extensive use of and need for high performance voltage regulators in computer systems, though high performance voltage regulators can also be used in other types of electronic systems.

For example, the DDR memory systems can correspond to one or more sets of direct inline memory modules (DIMMs). As an example, a computer system manufacturer or user can include different DIMMs for a respective computer system, with each of the DIMMs having differing capacitance for the associated voltage regulators. The voltage regulators associated with the respective DIMMs can thus exhibit different transfer function characteristics, such as over time as capacitors age.

Figure 2:
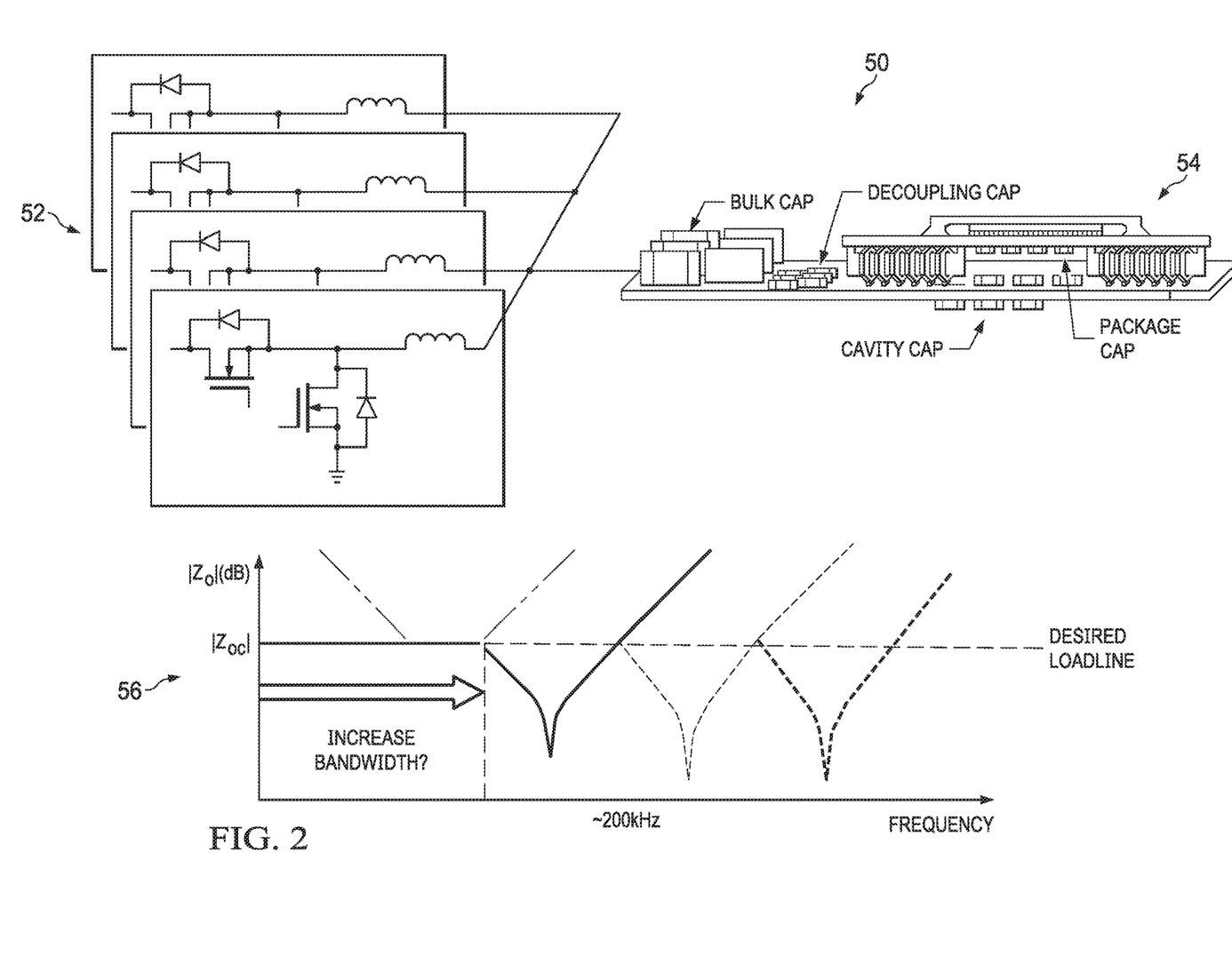
FIG. 2 illustrates an example diagram of voltage regulators and capacitor characteristics.

FIG. 2 illustrates an example diagram 50 of voltage regulators and capacitor characteristics. The diagram 50 includes multiple voltage regulators at 52, such as can correspond to the multiple voltage regulators demonstrated in the example of FIG. 1. The voltage regulators 52 can each include one or more capacitors, such as a bulk capacitor, a package capacitor, a decoupling capacitor, and a cavity capacitor, demonstrated at 54. The capacitors 54 can each correspond to different output capacitors for different voltage regulator systems. The diagram 50 also includes a graph of impedance as a function of frequency at 56. Thus, the graph 56 demonstrates that the capacitors have differing impedance characteristics as a function of frequency. Therefore, the graph 56 demonstrates that load transient requirements for the different types of capacitors can vary greatly, and can be important for each of the different types of voltage regulators.

Figure 3:
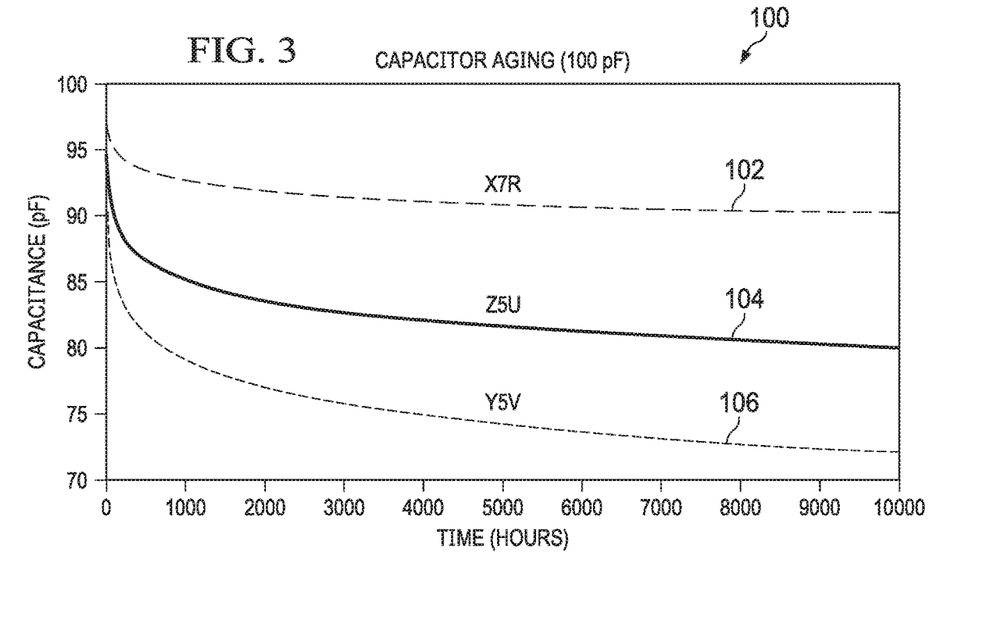
FIG. 3 illustrates an example graph of capacitor aging.

FIG. 3 illustrates an example graph 100 of capacitor aging. The graph 100 demonstrates a capacitance of three different types of capacitors, demonstrated at 102, 104, and 106, plotted versus time (in hours). In the example of FIG. 3, the capacitors are demonstrated as each having an initial capacitance of approximately 100 picofarads, with each of the capacitors having a capacitance that degrades over the time. For example, the first capacitor 102 can correspond to a package capacitor, the second capacitor 104 can correspond to a cavity capacitor, and the third capacitor 106 can correspond to a bulk capacitor, such as demonstrated in the example of FIG. 2 at 54. As demonstrated by the graph 100, the different capacitors can degrade in capacitance at different rates over time, and can thus be affected by aging in different ways.

Figure 4:
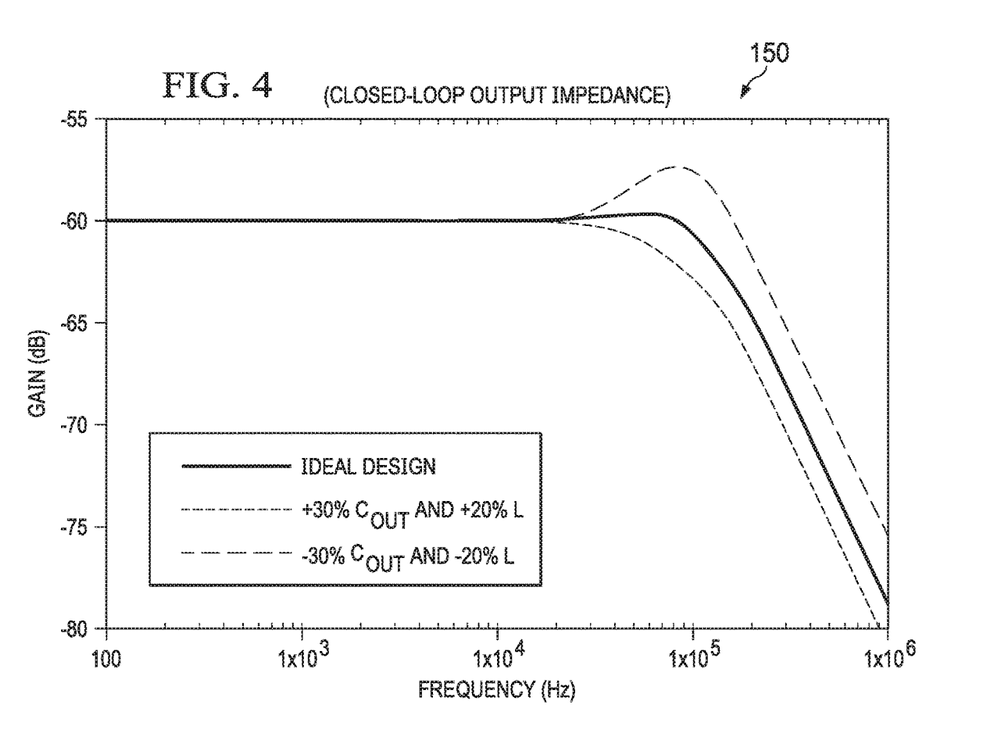
FIG. 4 illustrates an example graph of closed-loop output impedance.

FIG. 4 illustrates an example graph 150 of closed loop output impedance. The graph 150 demonstrates the closed loop output impedance based on a gain (in dB) of a given voltage regulator as a function of frequency (in Hz). The graph 150 includes an ideal design of a voltage regulator, demonstrated by a solid line, as well as variations in output capacitance $C_{OUT}$ and load L. In the example of FIG. 4, the graph 150 demonstrates a dotted line corresponding to a voltage regulator having a 30% increase in output capacitance $C_{OUT}$ and a 20% increase in output load L. Additionally, the graph 150 demonstrates a dashed line corresponding to a voltage regulator having a 30% decrease in output capacitance $C_{OUT}$ and a 20% decrease in output load L. Thus, the graph 150 demonstrates a divergence in the gain, and thus the closed-loop output impedance, of the voltage regulators at frequencies greater than 10 kHz. As a result, the graph 150 demonstrates that the amplitude of the output capacitance $C_{OUT}$ and the load L affect the characteristics (e.g., closed-loop output impedance) of a given voltage regulator.

Figure 5:
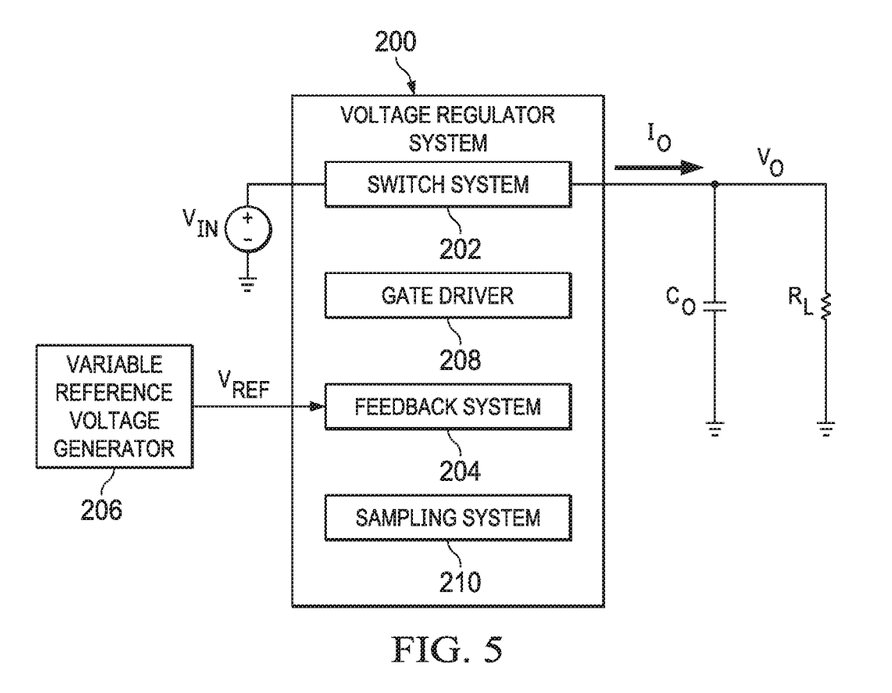
FIG. 5 illustrates an example block diagram of a voltage regulator system.

FIG. 5 illustrates an example block diagram of a voltage regulator system 200. The voltage regulator system 200 can be implemented in any of a variety of power supply applications, such as for supplying power in a memory module (e.g., a DIMM for a DDR memory system). The voltage regulator system 200 includes a switch system 202 that includes at least one power switch (e.g., a high-side switch and a low-side switch). The power switch(es) of the switch system 202 is controlled by a respective at least one switching signal and is configured to conduct an output current $I_O$ through an inductor (not shown in the example of FIG. 5) based on an input voltage $V_{IN}$ to generate an output voltage $V_O$ across an output capacitor $C_O$ to a load $R_L$. As an example, the load $R_L$ can correspond to a variable load, such that the load resistance can vary during startup of the voltage regulator system 200.

The voltage regulator system 200 also includes a feedback system 204. For example, the feedback system 204 is configured to generate a PWM signal based on the output voltage $V_O$ and based on a variable reference voltage $V_{REF}$. In the example of FIG. 5, the variable reference voltage $V_{REF}$ is provided from a variable reference voltage generator 206. As an example, the variable reference voltage generator 206 can be on or off-chip with respect to the voltage regulator system 200. For example, the variable reference voltage generator 206 is configured to provide the variable reference voltage $V_{REF}$ as a multi-slope reference voltage, such that during each of different startup stages of the voltage regulator system 200, the variable reference voltage $V_{REF}$ has a different linear slope (e.g., increasing in slope in each successive startup stage). As another example, the startup of the voltage regulator system 200 can occur over a plurality of startup stages, such that the variable reference voltage $V_{REF}$ increases at each of the reference voltage slopes until a final (e.g., maximum) constant amplitude of the variable reference voltage $V_{REF}$ is achieved, such that startup of the voltage regulator system 200 is complete, and normal operation of the voltage regulator system 200 commences.

The voltage regulator system 200 also includes a gate driver system 208 configured to generate the switching signal(s) based on the PWM signal. The gate driver system 208 can further be configured to control the switch system 202 to increase the output voltage $V_O$ at each of respective output voltage slopes in each of the startup stages during startup of the voltage regulator system 200. Therefore, the output voltage $V_O$ can increase at each of different slopes during the separate respective startup stages of the voltage regulator system 200 based on the variable reference voltage $V_{REF}$. In addition, as described herein, the transfer function of the gate driver system 208 can be adjusted in response to detecting aging of the output capacitor $C_O$ of the voltage regulator system 200 to maintain a more efficient operation of the voltage regulator system 200 over time compared to many existing voltage regulator systems.

Furthermore, the voltage regulator system 200 includes a sampling system 210 configured to sample the output current $I_O$ and the output voltage $V_O$ during the startup of the voltage regulator system 200, such as during each of the respective startup stages during the startup of the voltage regulator system 200. For example, in each of the startup stages, the sampling system 210 is configured to measure the output current $I_O$ to determine a time at which the output current $I_O$ has an approximately constant amplitude. Based on the relationship between the capacitance of the output capacitor $C_O$, the output current $I_O$, and the output voltage $V_O$, an approximately constant amplitude of the output current $I_O$ can be indicative of a linear increase of the amplitude of the output voltage $V_O$. That is, when the output current $I_O$ settles to an approximately constant amplitude during a given startup stage, the output voltage $V_O$ linearly increases with a positive slope during the given stage.

As an example, the output current $I_O$ can be equal to the capacitance of the output capacitor $C_O$ times a rate of change of the output voltage $V_O$ (e.g., $dV_O/dt$) plus $V_O/R_L$. Therefore, in response to detecting an approximately constant amplitude of the output current $I_O$, the sampling system can measure the output voltage $V_O$ to measure the slope of the output voltage $V_O$ for the respective one of the respective startup stages (e.g., via an analog-to-digital converter (ADC)). The sampling system 210 can thus be configured to calculate a capacitance of the output capacitor $C_O$ and/or the resistance of the load $R_L$. As a result, the sampling system 210 can modify the transfer function of the voltage regulator system 200 accordingly, and/or can provide an indication of unacceptable aging of the output capacitor, as described in herein.

Figure 6:
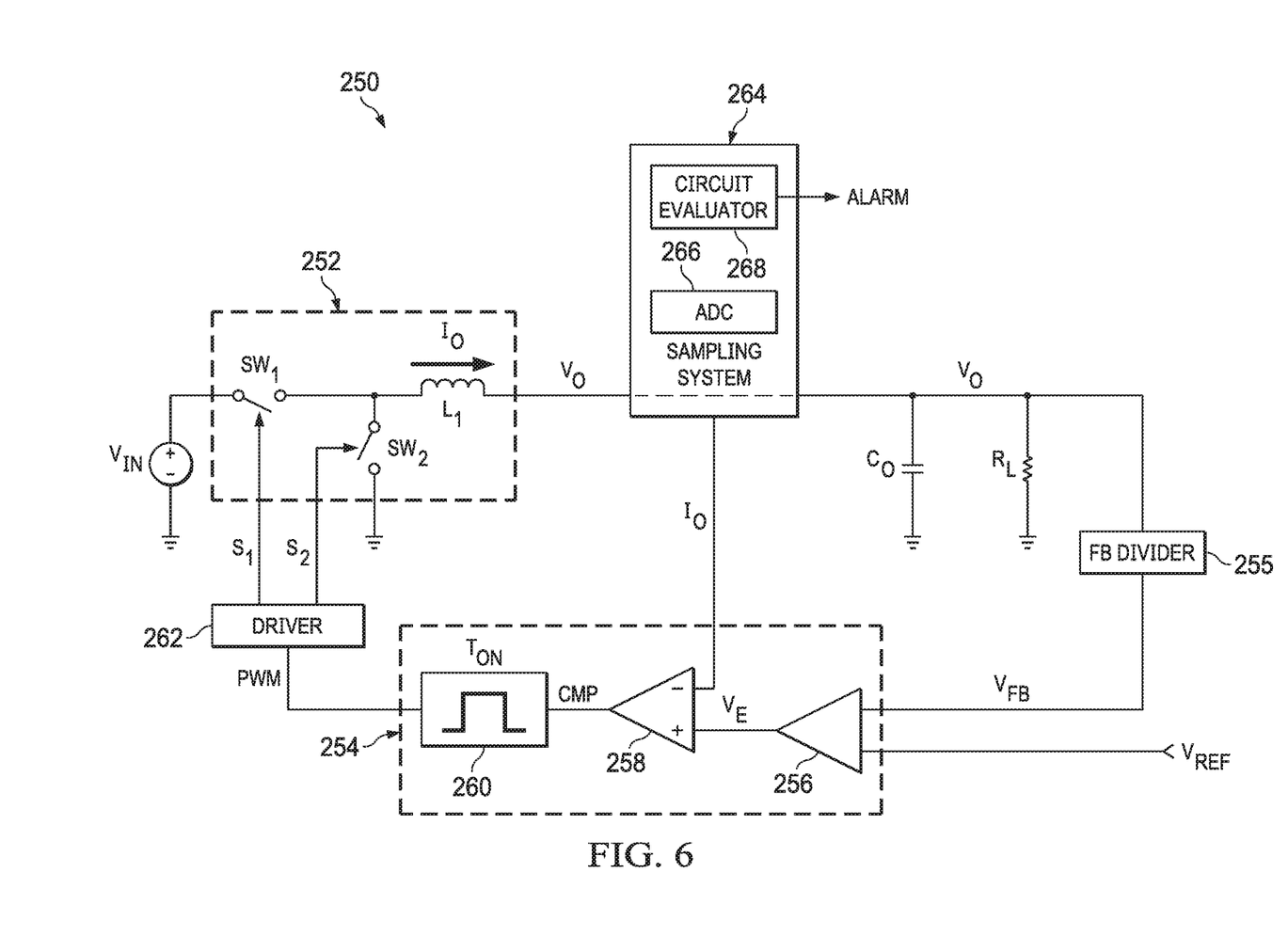
FIG. 6 illustrates an example of a voltage regulator circuit.

FIG. 6 illustrates an example of a voltage regulator circuit 250. The voltage regulator circuit 250 can be implemented in any of a variety of power supply applications, such as for a memory module (e.g., a DIMM for a DDR memory system). As an example, the voltage regulator circuit 250 can correspond to the voltage regulator system 200 in the example of FIG. 5, and can thus correspond to one of the voltage regulator systems 52 in the example of FIG. 2. Therefore, reference is to be made to the examples of FIGS. 1-5 in the following description of the example of FIG. 6.

The voltage regulator circuit 250 includes a switch system 252 (e.g., corresponding to switch system 202) that includes a first power switch and a second power switch, demonstrated as a high-side switch $SW_1$ and a low-side switch $SW_2$. As an example, the power switches $SW_1$ and $SW_2$ can each be configured as metal-oxide semiconductor field-effect transistors (MOSFETs). The power switches $SW_1$ and $SW_2$ are controlled by respective switching signals $S_1$ and $S_2$ to conduct an output current $I_O$ through an inductor $L_1$ from an input voltage $V_{IN}$ via the high-side switch $SW_1$ and from a low-voltage rail (e.g., ground) via the low-side switch $SW_2$ to generate the output voltage $V_O$ across the output capacitor $C_O$ and to the load $R_L$. As an example, the load $R_L$ can correspond to a variable load, such that the load resistance can vary during startup of the voltage regulator circuit 250. For example, leakage currents can begin to flow in response to a memory controller receiving power via the output voltage $V_O$, which can thus change the resistance of the load $R_L$.

The voltage regulator circuit 250 also includes a feedback system 254 (e.g., corresponding to feedback system 204). For example, the feedback system 254 is configured to generate a pulse-width modulation (PWM) signal, demonstrated in the example of FIG. 5 as a signal "PWM", based on a feedback voltage VFB, generated based on the output voltage $V_O$ by a feedback divider ("FB DIVIDER") 255, and based on a variable reference voltage $V_{REF}$. In the example of FIG. 5, the feedback system 254 includes a compensation amplifier 256, a comparator 258, and a timing generator 260. The compensation amplifier 256 is configured receive the output current $I_O$ (e.g., as sampled from a sampling system, as described herein) and the variable reference voltage $V_{REF}$ and to generate an error voltage $V_E$ based on an amplitude difference between the variable reference voltage $V_{REF}$ and the output voltage $V_O$. The comparator 258 is configured to compare the error voltage $V_E$ with the output voltage $V_O$ to generate a comparison signal CMP that is provided to the timing generator 260. The timing generator 260 generates the signal PWM that is provided to define on-time $T_{ON}$ to a gate driver 262 (e.g., corresponding to gate driver 208). The gate driver 262 thus generates the switching signals $S_1$ and $S_2$ to control the high-side switch $SW_1$ and the low-side switch $SW_2$, respectively, based on the signal PWM.

As described herein, the variable reference voltage $V_{REF}$ can be provided from a variable reference voltage generator (e.g., the variable reference voltage generator 206). As an example, the variable reference voltage $V_{REF}$ can correspond to a multi-slope reference voltage, such that during each of different startup stages of the voltage regulator circuit 250, the variable reference voltage $V_{REF}$ has a different linear slope (e.g., the slope increases in each successive startup stage). As a result, the signal PWM can be provided to control the gate driver 262 to set the duty-cycle of operation of the high-side switch $S_1$ and the low-side switch $S_2$ to provide the output voltage $V_O$ to likewise exhibit a multi-slope increase. For example, the output voltage $V_O$ can increase linearly during each of different startup stages of the voltage regulator circuit 250 at a different slope (e.g., $V_O$ increases in slope in each successive startup stage).

The voltage regulator circuit 250 includes a sampling system 264 (e.g., corresponding to sampling system 210) that is configured to sample the output current $I_O$ and the output voltage $V_O$ during the startup of the voltage regulator circuit 250, such as during each of the respective startup stages during the startup of the voltage regulator circuit 250. For example, in each of the startup stages, the sampling system 264 is configured to measure the output current $I_O$ to determine the time at which the output current $I_O$ has an approximately constant amplitude. In response to determining that the output current $I_O$ has an approximately constant amplitude, the sampling system 264 is further configured to sample the output voltage $V_O$. Based on the current and voltage samples obtained, the sampling system 264 can thus be configured to calculate the slope of the output voltage $V_O$ (e.g., based on amplitude and time duration) for the respective one of the respective startup stages. In the example of FIG. 6, the sampling system 264 includes an ADC system 266 that can include at least one ADC to digitally sample the output current $I_O$ and the output voltage $V_O$ at each of a predetermined number of sampling times. The sampling of the output current $I_O$ and the output voltage $V_O$ can be performed in any of a variety of ways (e.g., via a sampling resistor).

In the example of FIG. 6, the sampling system 264 includes a circuit evaluator 268. As an example, the circuit evaluator 268 is configured as any of a variety of devices to evaluate the output voltage $V_O$ and to calculate an amplitude of the load $R_L$ and the capacitance of the output capacitor $C_O$ in each of the startup stages. As an example, the circuit evaluator 268 can be configured as a processor, an application specific integrated circuit (ASIC), a dedicated logic circuit, a field programmable gate array (FPGA), or any of a variety of other types of devices that can implement the calculation of the amplitude of the load $R_L$ and the capacitance of the output capacitor $C_O$ in each of the startup stages. As described herein, the term "calculate", as provided by the operation of the circuit evaluator 268, can define that the circuit evaluator 268 provides mathematical operations to determine the amplitude of the load $R_L$ and the capacitance of the output capacitor $C_O$ in each of the startup stages, or can define other manners of determining the load $R_L$ and the capacitance of the output capacitor $C_O$ in each of the startup stages (e.g., extrapolation based on a lookup table). For example, the circuit evaluator 268 is configured to solve multiple equations for each of the respective slopes to calculate the magnitude of the load $R_L$ and the capacitance of the output capacitor $C_O$.

As a first example, the variable reference voltage $V_{REF}$ can be provided as having two different slopes in respective two startup stages. Therefore, the circuit evaluator 268 can solve for two equations, such as demonstrated below:

$$C_{o1} \cdot s_{r1} = \left(I_1 - \frac{v_{o1B}}{R_L}\right) \qquad \text{Equation 1}$$

$$C_{o2} \cdot s_{r2} = \left(I_2 - \frac{v_{o2B}}{R_L}\right) \qquad \text{Equation 2}$$

$$\text{Where: } s_{r1} = \left(\frac{v_{o1B} - v_{o1A}}{\Delta t_1}\right); \qquad \text{Equation 3}$$

$$s_{r2} = \left(\frac{v_{o2B} - v_{o2A}}{\Delta t_2}\right); \qquad \text{Equation 4}$$

$C_{O1}$ is the capacitance of the output capacitor $C_O$ during the first startup stage;

$C_{O2}$ is the capacitance of the output capacitor $C_O$ during the second startup stage;

$\Delta t_1$ is a sampling duration corresponding to the total sampling time during the first slope of the respective first startup stage;

$\Delta t_2$ is a sampling duration corresponding to the total sampling time during the second slope of the respective second startup stage;

$V_{O1A}$ is a first sampled voltage at the beginning of the total sampling time of the first startup stage;

$V_{O1B}$ is a last sampled voltage at the end of the total sampling time of the first startup stage (e.g., the last sample);

$V_{O2A}$ is a first sampled voltage at the beginning of the total sampling time of the second startup stage;

$V_{O2B}$ is a last sampled voltage at the end of the total sampling time of the second startup stage (e.g., the last sample);

$I_1$ is the amplitude of the output current $I_O$ during the first slope; and $I_2$ is the amplitude of the output current $I_O$ during the second slope.

In this example, the circuit evaluator 268 can assume that the capacitances $C_{O1}$ and $C_{O2}$ are approximately equal with low DC bias voltages, such as based on a low amplitude of DC bias having a limited effect on the output voltage $V_O$. Additionally, the circuit evaluator 268 can assume that if the load resistance $R_L$ is very high, the capacitance values $C_{O1}$ and $C_{O2}$ are not equal and the capacitance values $C_{O1}$ and $C_{O2}$ can be solved by ignoring the error of $V_O/R_L$. For example, because the circuit evaluator 268 is implementing a two-equation solution to solve two parameters, the circuit evaluator 268 can be configured to calculate either the amplitude of the equal capacitance $C_{O1}$ and $C_{O2}$ and the load $R_L$, or to solve the amplitudes of $C_{O1}$ and $C_{O2}$ separately while ignoring the amplitude of the load $R_L$. Therefore, the circuit evaluator 268 can solve for the capacitance values $C_{O1}$ and $C_{O2}$ and/or the load $R_L$, such as based on the preferences of the user to achieve the most accurate results.

Figure 7:
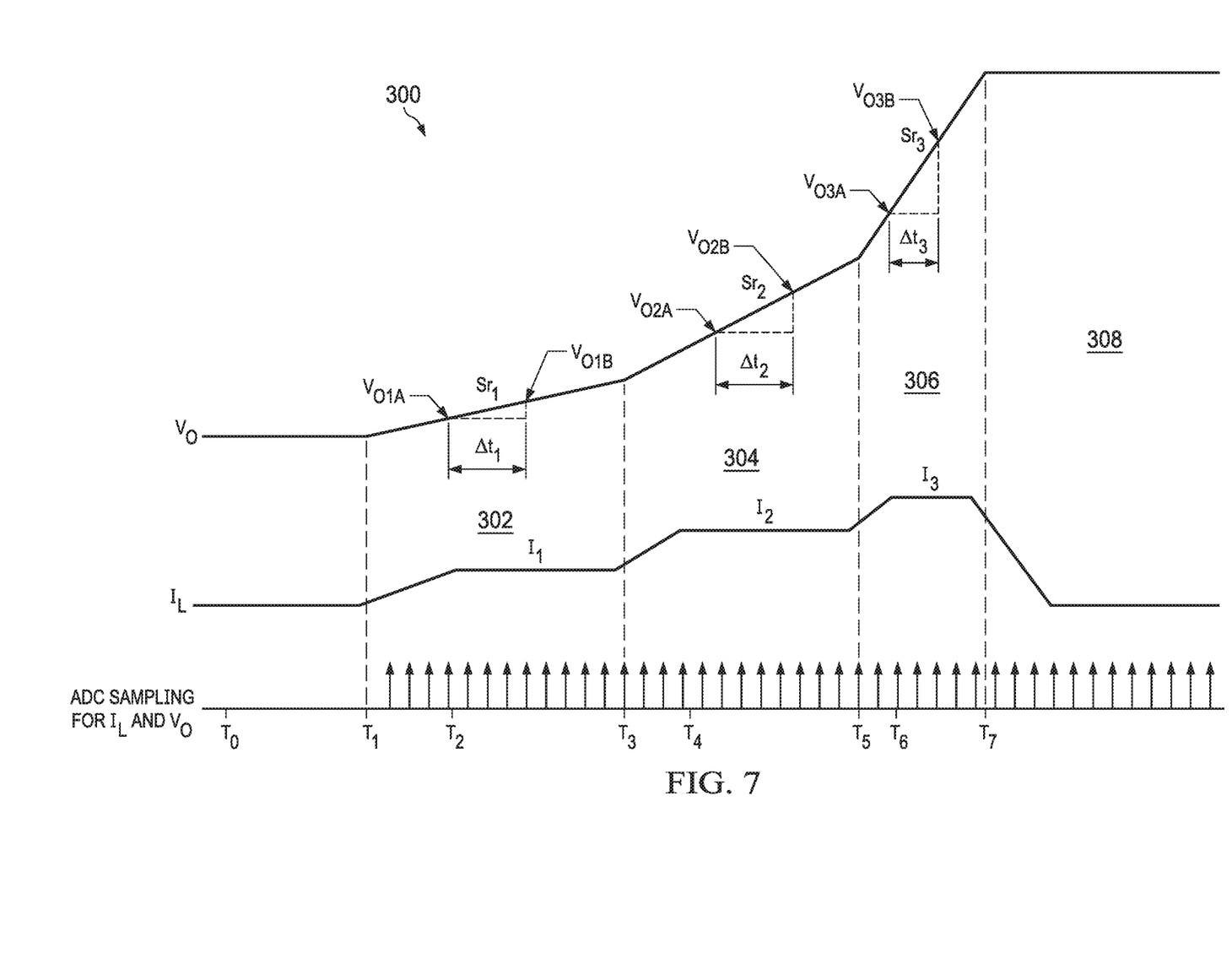
FIG. 7 illustrates an example timing diagram.

Another example timing diagram 300 is demonstrated with reference to FIG. 7. The timing diagram 300 demonstrates a startup of the voltage regulator system (e.g., the voltage regulator system 200 or the voltage regulator circuit 250) that includes three startup stages. In the example of FIG. 7, the startup stages are demonstrated between dotted lines as including a first startup stage 302, a second startup stage 304, and a third startup stage 306. After the startup of the voltage regulator system, the voltage regulator system begins operating in a normal operating mode, demonstrated in the example of FIG. 7 at 308.

The timing diagram 300 demonstrates the output voltage $V_O$ and the output current $I_O$ plotted as a function of time. The timing diagram 300 begins at a time T0 in which the output voltage $V_O$ and the output current $I_O$ can each have an amplitude of approximately zero. At a time T1, the first startup stage 302 begins. For example, the variable reference voltage $V_{REF}$ can be provided to the feedback stage 254 as a voltage that increases from approximately zero volts at a first reference voltage slope. In response, the gate driver (e.g., gate driver 208, 262) begins to control the high-side switch $SW_1$ and the low-side switch $SW_2$, such that the output current $I_O$ begins to flow through the inductor $L_1$. Therefore, at the time T1, the output current $I_O$ begins to increase from approximately zero amps to an approximately constant amplitude $I_1$ at a time T2. While the output current $I_O$ is increasing, the output voltage $V_O$ is also increasing, which can be a nonlinear increase from the time T1 to the time T2. Therefore, beginning at the time T1, the sampling systems 210 and 264 can begin sampling the output current $I_O$ by the ADC system 266.

At the time T2 or shortly thereafter, the sampling system 264 can determine that the output current $I_O$ has an approximately constant amplitude (e.g., the amplitude $I_1$). Therefore, at the time T2, the output voltage $V_O$ will begin exhibiting an approximately linear increase at a first output voltage slope. The sampling system 264 can thus begin sampling the output voltage $V_O$ by the ADC system 266 beginning at the time T2 or shortly thereafter. In the example of FIG. 7, the sampling system 264 can sample the output voltage $V_O$ at a predetermined number of samples that defines the sampling duration $\Delta t_1$, and thus determines the amplitudes $V_{O1A}$ and $V_{O1B}$ of the output voltage $V_O$.

At a time T3, the second startup stage 304 begins. For example, the variable reference voltage $V_{REF}$ can change from the first reference voltage slope to a second reference voltage slope (e.g., a greater slope than the first reference voltage slope). In response, the gate driver begins to control the high-side switch $SW_1$ and the low-side switch $SW_2$, such that the output current $I_O$ begins to increase from the approximately constant amplitude $I_1$ to an approximately constant amplitude $I_2$ at a time T4. While the output current $I_O$ is increasing, the output voltage $V_O$ is also increasing, which can be a nonlinear increase from the time T3 to the time T4. Therefore, beginning at the time T3, the sampling system 264 can sample the output current $I_O$ by the ADC system 266.

At the time T4 or shortly thereafter, the sampling system 264 can determine that the output current $I_O$ has an approximately constant amplitude (e.g., the amplitude $I_2$). Therefore, at the time T4, the output voltage $V_O$ will begin exhibiting an approximately linear increase at a second output voltage slope (e.g., having a greater slope than the first output voltage slope). The sampling system 264 can thus begin sampling the output voltage $V_O$ by the ADC system 266 beginning at the time T4 or shortly thereafter. In the example of FIG. 7, the sampling system 264 can sample the output voltage $V_O$ a number of samples at a sample rate to that defines the sampling duration $\Delta t_2$, and thus determines the amplitudes $V_{O2A}$ and $V_{O2B}$ of the output voltage $V_O$.

At a time T5, the third startup stage 306 begins. For example, the variable reference voltage $V_{REF}$ can change from the second reference voltage slope to a third reference voltage slope (e.g., a greater slope than the second reference voltage slope). In response, the gate driver begins to control the high-side switch $SW_1$ and the low-side switch $SW_2$, such that the output current $I_O$ begins to increase from approximately the approximately constant amplitude $I_2$ to an approximately constant amplitude $I_3$ at a time T6. While the output current $I_O$ is increasing, the output voltage $V_O$ is also increasing, which can be a nonlinear increase from the time T5 to the time T6. Therefore, beginning at the time T5, the sampling system 264 can sample the output current $I_O$ by the ADC system 266.

At the time T6 or shortly thereafter, the sampling system 264 can determine that the output current $I_O$ has an approximately constant amplitude (e.g., the amplitude $I_3$). Therefore, at the time T6, the output voltage $V_O$ will begin exhibiting an approximately linear increase at a third output voltage slope (e.g., having a greater slope than the second output voltage slope). The sampling system 264 can thus begin sampling the output voltage $V_O$ by the ADC system 266 beginning at the time T6 or shortly thereafter. In the example of FIG. 7, the sampling system 264 can sample the output voltage $V_O$ at a sample rate for a predetermined number of samples that defines a sampling duration $\Delta t_3$, and thus determines the amplitudes $V_{O3A}$ and $V_{O3B}$ of the output voltage $V_O$.

At a time T7, the variable reference voltage $V_{REF}$ can achieve an approximately constant maximum amplitude. As a result, the startup of the voltage regulator circuit 250 is concluded, and the voltage regulator circuit 250 can begin the normal operating mode 308. Accordingly, the output voltage $V_O$ can achieve an approximate maximum constant amplitude.

In response to determining the slopes of the output voltage $V_O$ in each of the startup stages 302, 304, and 306, the circuit evaluator 268 can determine the capacitance of the output capacitor $C_O$. Instead of implementing a two-equation solution, as provided in Equations 1-4 as described previously, the circuit evaluator 268 can implement a three-equation solution, including an equation for each of the startup stages 302, 304, and 306. For example, in addition to implementing Equations 1-4, the circuit evaluator 268 to calculate the load $R_L$ and the capacitance of the output capacitor $C_O$ in each of the startup stages, the circuit evaluator 268 is configured to calculate the output capacitance according to Equations 5 and 6 as follows:

$$C_{o3} \cdot s_{r3} = \left( I_3 - \frac{v_{o3B}}{R_L} \right) \qquad \text{Equation 5}$$

$$\text{Where: } s_{r3} = \left( \frac{v_{o3B} - v_{o3A}}{\Delta t_3} \right); \qquad \text{Equation 6}$$

$C_{O3}$ is the capacitance of the output capacitor $C_O$ during the third startup stage 306;

$\Delta t_3$ is a sampling duration corresponding to the total sampling time during the third slope of the respective third startup stage 306;

$V_{O3A}$ is a first sampled voltage at the beginning of the total sampling time of the third startup stage 306;

$V_{O3B}$ is a last sampled voltage at the end of the total sampling time of the third startup stage 306 (e.g., the last sample); and $I_3$ is the amplitude of the output current $I_O$ during the third startup stage 306.

In this example, the circuit evaluator 268 can separately calculate the capacitances $C_{O1}$, $C_{O2}$, and $C_{O3}$ to accommodate nonlinear effects associated with the capacitance of the output capacitor $C_O$. Therefore, the circuit evaluator 268 can solve for the capacitance values $C_{O1}$, $C_{O2}$, and $C_{O3}$, as well as the load $R_L$. The system described herein is not limited to two or three different startup stages, but could include any number of startup stages, with each exhibiting a different slope, for purposes of calculating the output capacitance $C_O$ and the load $R_L$ based on an equal number of equations. For example, a greater number of slopes of the startup can result in a more accurate calculation of the capacitance value of the output capacitor $C_O$.

Referring back to the example of FIG. 6, in response to calculating the capacitance of the output capacitor $C_O$ and the resistance of the load $R_L$, the circuit evaluator 268 can be configured to modify the transfer function of the voltage regulator circuit 250. For example, the circuit evaluator 268 can determine that the output capacitor $C_O$ has exhibited aging based on a change in the capacitance value of the output capacitor $C_O$ during each of the startup stages. For example, the circuit evaluator 268 can refer to a capacitor lookup table (e.g., stored in memory—not shown), and/or can store capacitance values of the output capacitor $C_O$ from an initial value and/or from previous startups of the voltage regulator circuit 250. Therefore, in response to detecting aging of the output capacitor $C_O$ (e.g., in response to detecting a decrease of the capacitance of the output capacitor $C_O$ by a predetermined amount), the circuit evaluator 268 can adjust the transfer function of the of the voltage regulator circuit 250 to provide for more efficient operation of the voltage regulator circuit 250.

In addition, in the example of FIG. 6, the circuit evaluator 268 can be configured to provide an alarm signal ALRM that can be generated to provide an indication of the aging of the output capacitor $C_O$. For example, the circuit evaluator 268 can be configured to assert the alarm signal ALRM in response to the capacitance value of the output capacitor ALRM decreasing to below a predetermined threshold. Accordingly, a processor (not shown) or other control system can provide indication to a user to change or replaced the output capacitor $C_O$ to ensure a most efficient operation of the voltage regulator circuit 250.

Figure 8:
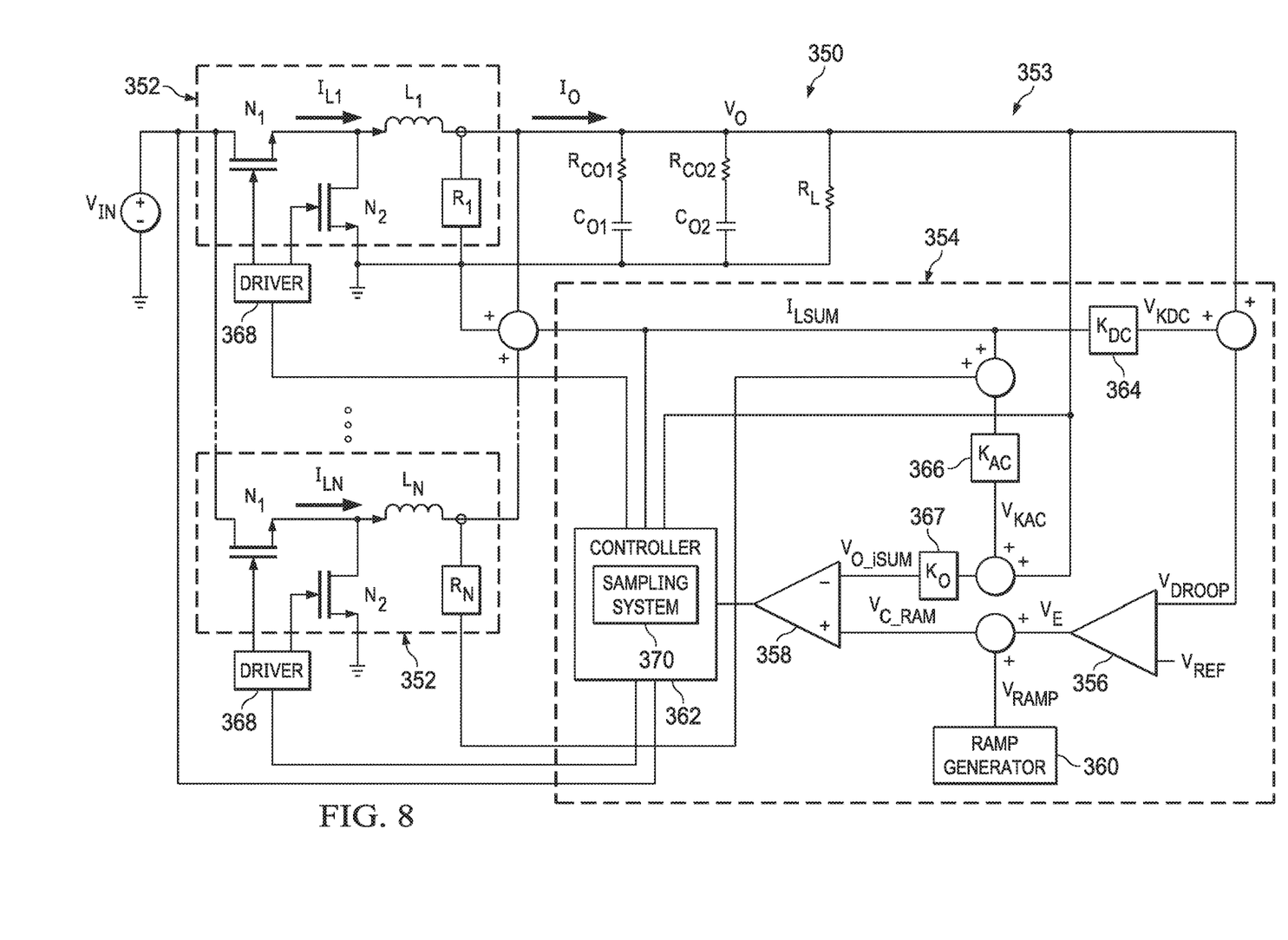
FIG. 8 illustrates another example of a voltage regulator circuit.

FIG. 8 illustrates another example of a voltage regulator circuit 350. The voltage regulator circuit 350 demonstrates another example of a voltage regulator circuit that includes multiple switch systems controlled by multiple gate drivers. The voltage regulator circuit 350 can be implemented in any of a variety of power supply applications, such as for a memory module (e.g., a DIMM for a DDR memory system). As an example, the voltage regulator circuit 350 can correspond to the voltage regulator system 300 in the example of FIG. 5, and can thus correspond to one of the voltage regulator systems 52 in the example of FIG. 2. Therefore, reference is to be made to the examples of FIGS. 1-6 in the following description of the example of FIG. 8.

The voltage regulator circuit 350 includes a plurality N of switch systems 352 that each include a first power switch and a second power switch, demonstrated as a high-side switch $N_1$ and a low-side switch $N_2$. In the example of FIG. 8, the power switches $N_1$ and $N_2$ are each configured as N-channel MOSFETs. Though, other types of transistors could be used in other examples. The power switches $N_1$ and $N_2$ in each switch system are controlled via respective switching signals $S_1$ and $S_2$ to conduct respective output currents $I_{L1}$ through $I_{LN}$, which are provided through a respective inductors $L_1$ through $L_N$ from an input voltage $V_{IN}$ through the high-side switch $N_1$ and from a low-voltage rail (e.g., ground) through the low-side switch $N_2$ to generate an output current $I_O$. The output current $I_O$, which is a sum of the respective output currents $I_{L1}$ through $I_{LN}$, is supplied to generate the output voltage $V_O$ at a common output 353 across a first output capacitor $C_{O1}$ (e.g., via a resistor $R_{CO1}$) and a second output capacitor $C_{O2}$ (e.g., via a resistor $R_{CO2}$) and to the load $R_L$ based on the output current $I_O$. As an example, the load can correspond to a variable load, such that the load resistance $R_L$ can vary during startup of the voltage regulator circuit 350. For example, leakage currents can begin to flow in response to a memory controller receiving power via the output voltage $V_O$, which can thus change the resistance of the load $R_L$. Additionally, each of the switch systems 352 includes a sampling resistor $R_1$ through $R_N$ through which a portion of the respective output currents $I_{L1}$ through $I_{LN}$ are provided for measuring the respective output currents. In the example of FIG. 8, the output currents $I_{L1}$ through $I_{LN}$ are combined to form a current $I_{LSUM}$.

The voltage regulator circuit 350 also includes a feedback system 354. For example, the feedback system 354 is configured to generate PWM signals PWM1 through PWMN based on the output voltage VO and based on a variable reference voltage VREF. In the example of FIG. 5, the feedback system 354 includes a compensation amplifier 356, a comparator 358, and a ramp generator 360. Additionally, the feedback system 354 includes a controller 362. The compensation amplifier 356 is configured receive the variable reference voltage VREF and a voltage VDROOP that is a sum of the output voltage VO and a voltage VKDC that is provided by an amplifier 364. In the example of FIG. 8, the amplifier 364 receives the current ILSUM, such that the voltage VKDC corresponds to an amplified version of a voltage corresponding to a sum of the output currents IL1 through ILN. The voltage VDROOP is therefore a feedback voltage that is representative of a combination of the output voltage VO and a voltage associated with the current ILSUM. The compensation amplifier 356 thus provides an error voltage VE based on an amplitude difference between the variable reference voltage VREF and the voltage VDROOP that can correspond to a collective feedback voltage associated with each of the switch systems 352. The voltage VE is added to a ramp voltage VRAMP to generate a voltage VC_RAM that is provided to the comparator 358, along with a voltage VO_iSUM. The voltage VO_iSUM is provided via an amplifier 367 as a sum of an amplified voltage VKAC provided via an amplifier 366 that is added to the output voltage VO, wherein the voltage VKAC is a voltage corresponding to the current ILSUM, and thus a sum of the collective output currents IL1 through ILN. The voltage VO_iSUM is therefore a voltage that is representative of a combination of the output current IO and the current ILSUM. The comparator 362 is configured to generate a comparison signal CMP that is provided to the controller 362. The controller 362 generates the PWM signals PWM1 through PWMN that are provided to define the on-times to respective gate drivers 368. The gate drivers 368 thus generates the switching signals S1 and S2 to control the high-side switch N1 and the low-side switch N2, respectively, of each of the switch systems 352 based on the respective PWM signals PWM1 through PWMN.

Similar to as described herein, the variable reference voltage $V_{REF}$ can be provided from a variable reference voltage generator (e.g., the variable reference voltage generator 356). As an example, the variable reference voltage $V_{REF}$ can correspond to a multi-slope reference voltage, such that during each of different startup stages of the voltage regulator circuit 350, the variable reference voltage $V_{REF}$ can have a different linear slope of increase (e.g., increasing in slope in each successive startup stage). As a result, the signal PWM can be provided such that the gate drivers 368 are controlled to set the duty-cycle of operation of the high-side switch $S_1$ and the low-side switch $S_2$ to provide the output voltage $V_O$ to likewise exhibit a multi-slope increase. For example, the output voltage $V_O$ can increase during each of different startup stages of the voltage regulator circuit 350 at a different linear slope of increase (e.g., increasing in slope in each successive startup stage).

In the example of FIG. 8, the controller 362 includes a sampling system 370 (e.g., corresponding to sampling system 210, 264) that is configured to sample the output current $I_O$ and the output voltage $V_O$ during the startup of the voltage regulator circuit 350, such as during each of the respective startup stages during the startup of the voltage regulator circuit 350, similar to as described previously. Based on the samples obtained, the sampling system 370 can thus determine the slope of the output voltage $V_O$ for the respective one of the respective startup stages. As an example, the sampling system 370 can include a circuit evaluator (not shown, but see evaluator 268 of FIG. 6) that is configured to solve multiple equations for each of the respective slopes to calculate the magnitude of the load $R_L$ and the capacitance of the output capacitor $C_O$. In response to detecting changes in the capacitance of the output capacitor $C_O$, the circuit evaluator is configured to change the transfer function of the voltage regulator circuit 350, such as based on Equations 7 and 8 below that can correspond to the transfer function of the voltage regulator circuit 350:

$$\frac{v_o(s)}{v_c(s)} \approx \frac{1}{\left(1 + \frac{s}{Q_1 \omega_1} + \frac{s^2}{\omega_1^2}\right)} \cdot \frac{1}{1 + R_{Co1} \frac{C_{o1} \cdot C_{o2}}{C_{o1} + C_{o2}} s} \cdot \quad \text{Equation 7}$$

$$\frac{(R_{Co1} C_{o1} s + 1)\left(1 + \frac{s}{Q_1 \omega_{2m}} + \frac{s^2}{\omega_{2m}^2}\right)}{\left(1 + \frac{s}{Q_1 \omega_{2m}} + \frac{s^2}{\omega_{2m}^2}\right) \cdot \left(1 + \frac{s}{Q_3 \omega_2} + \frac{s^2}{\omega_{2m}^2}\right) +}$$

$$\frac{s_e}{K_o \cdot s_{fm}} (C_{o1} + C_{o2}) \frac{T_{sw}}{n} s^2$$

$$Q_3 = \frac{1}{K_{ac} \cdot R_i (C_{o1} + C_{o2}) + \frac{R_{Co1} C_{o2}^2}{C_{o1} + C_{o2}} - \frac{T_{on}}{2}} \cdot \frac{T_{sw}}{\pi}$$

$$Z_o(s) \approx \left[\frac{v_o(s)}{v_c(s)} - 1\right] \frac{(R_{Co1} C_{o1} s + 1)}{(R_{Co1} C_{o1} s + 1) \cdot C_{o2} s + C_{o1} s} \quad \text{Equation 8}$$

Accordingly, the circuit evaluator can adjust the transfer function with the updated values of the respective capacitors $C_{o1}$ and $C_{o2}$ to improve the load transient performance of the voltage regulator circuit 350 subsequent to the startup of the voltage regulator circuit 350.

Figure 9:
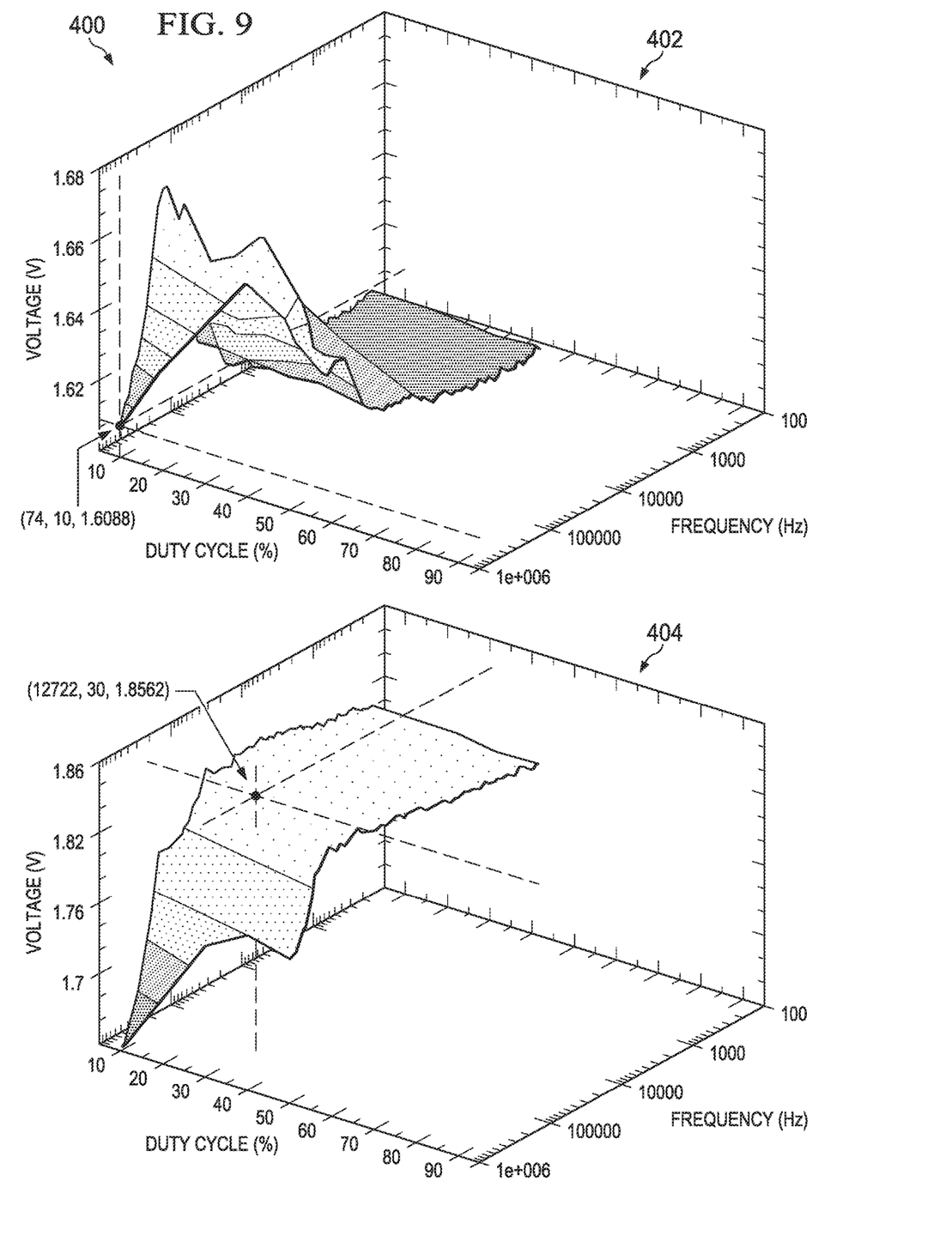
FIG. 9 illustrates an example diagram of load transients for a voltage regulator system.

FIG. 9 illustrates an example diagram 400 of load transients for a voltage regulator system. The diagram 400 demonstrates a first three-dimensional graph 402 that plots output voltage, load duty-cycles, and load frequencies, and demonstrates load transients for an undershoot performance of a voltage regulator circuit (e.g., the voltage regulator circuit 350). The diagram 400 also demonstrates a second three-dimensional graph 404 that likewise plots output voltage, load duty-cycles, and load frequencies, and demonstrates load transients for an overshoot performance of a voltage regulator circuit (e.g., the voltage regulator circuit 350). For example, the graphs 402 and 404 can describe a 3800 μF output capacitor, with a minimum voltage of approximately 1.064 volts at 40 kHz and 40% transient condition for the undershoot (e.g., graph 402) and a maximum voltage of approximately 1.862 volts at 192 kHz and 30% transient condition for the overshoot (e.g., graph 404).

Figure 10:
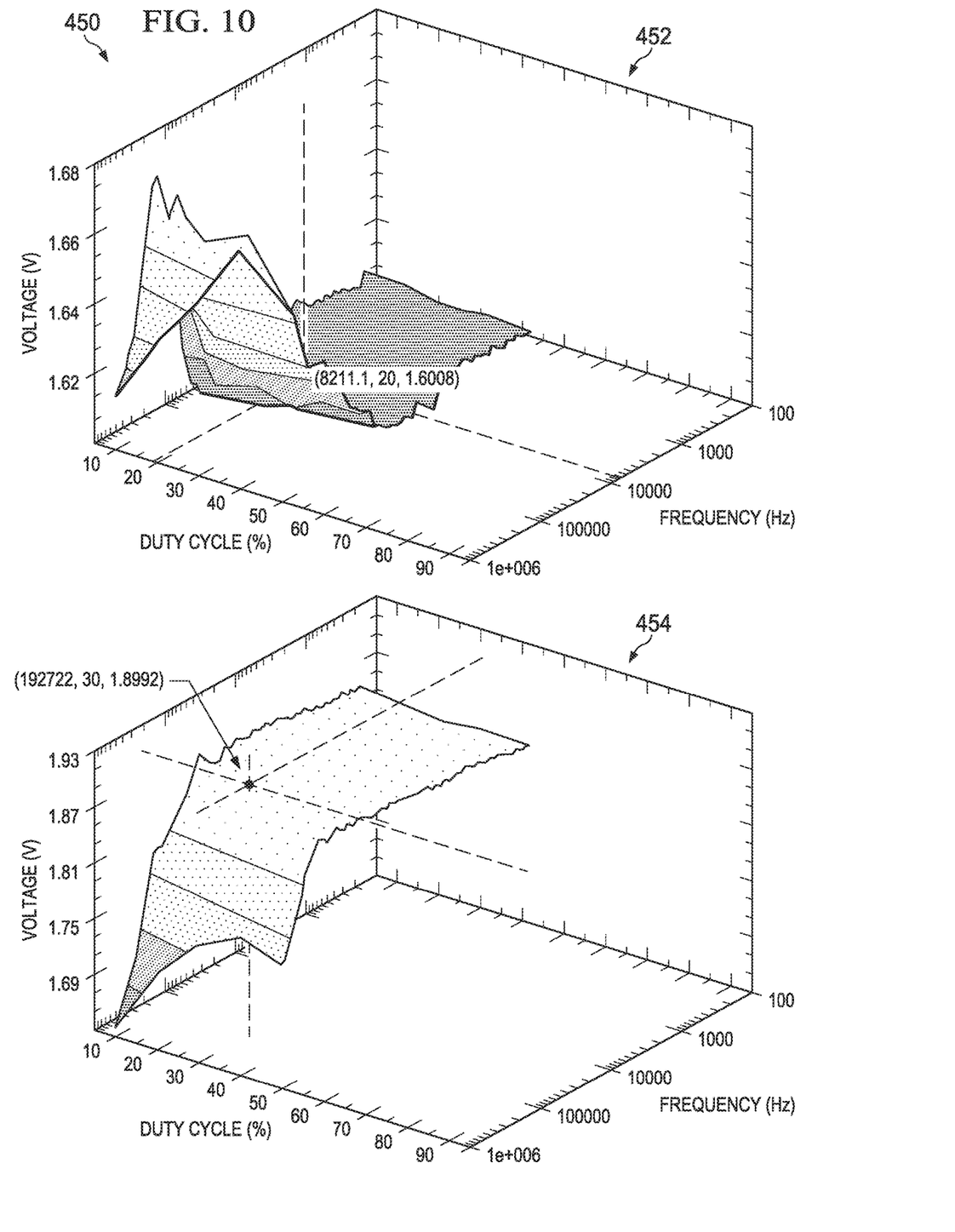
FIG. 10 illustrates another example diagram of load transients for a voltage regulator system.

FIG. 10 illustrates another example diagram 450 of load transients for a voltage regulator system (e.g., the voltage regulator system 350 of FIG. 8). The diagram 450 demonstrates a first three-dimensional graph 452 that plots output voltage, load duty-cycles, and load frequencies, and demonstrates load transients for an undershoot performance of a voltage regulator circuit (e.g., the voltage regulator circuit 350). The diagram 450 also demonstrates a second three-dimensional graph 454 that likewise plots output voltage, load duty-cycles, and load frequencies, and demonstrates load transients for an overshoot performance of a voltage regulator circuit (e.g., the voltage regulator circuit 350). The graphs 452 and 454 can demonstrate the effects of adjustment of the transfer function of the voltage regulator circuit 350 after determining that the output capacitor has a capacitance value of approximately 3400 g.

For example, if no change was made to the transfer function, as disclosed herein, the voltage regulator circuit 350 would exhibit a minimum voltage of approximately 1.6 volts at 28 kHz and 50% transient condition for the undershoot and a maximum voltage of approximately 1.906 volts at 192 kHz and 30% transient condition for the overshoot. However, in response to the modification of the transfer function, the graphs 452 and 454 can describe a minimum voltage of approximately 1.605 volts at 9.4 kHz and 10% transient condition for the undershoot (e.g., graph 452) and a maximum voltage of approximately 1.9 volts at 192 kHz and 30% transient condition for the overshoot (e.g., graph 454). As a result, the load transient performance of the voltage regulator circuit 350 is improved by approximately 11 mV peak-to-peak, for an approximately 30% or more improvement relative to a specified +/−15 mV rating. Accordingly, the adjustment to the transfer function can provide for a more efficient operation of the voltage regulator circuit 350.

Figure 11:
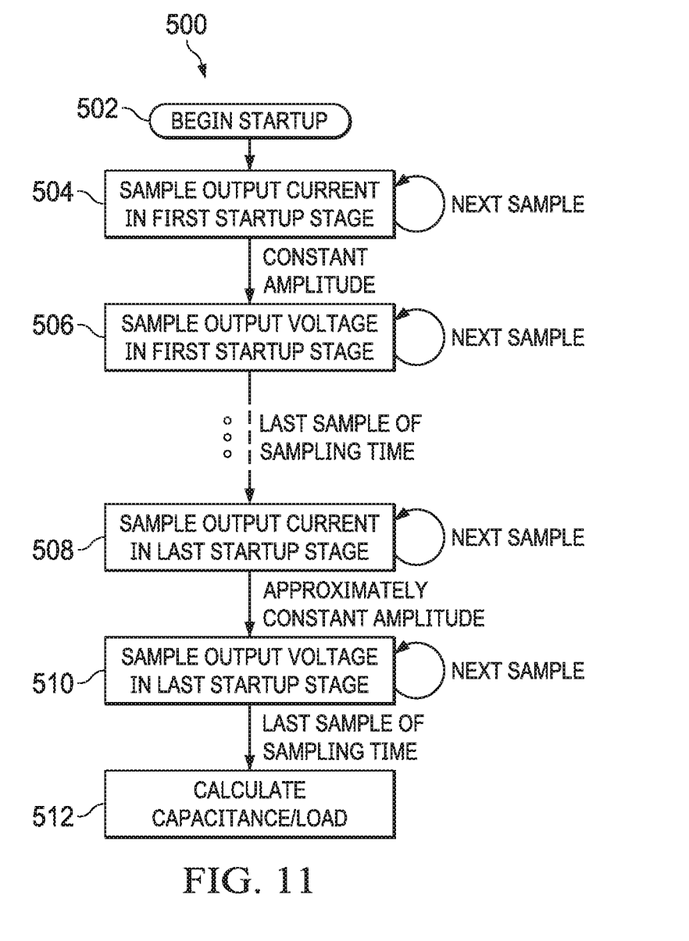
FIG. 11 illustrates an example of a state diagram for starting a voltage regulator system.

In view of the foregoing structural and functional features described above, a methodology in accordance with various aspects of the disclosure will be better appreciated with reference to FIG. 11. FIG. 11 illustrates an example of a state diagram 500 for starting a voltage regulator system. It is to be understood and appreciated that the state diagram of FIG. 11 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

At 502, the state diagram starts, where the voltage regulator system (e.g., the voltage regulator systems 200, 250, and 350) begins startup. At 504, the output current (e.g., the output current $I_O$) is sampled in the first startup stage. The output current can begin to increase based on the control of the switch system (e.g., the switch system 202) in response to a first reference voltage slope of a variable reference voltage (e.g., the variable reference voltage $V_{REF}$). The sampling continues at each sample ("NEXT SAMPLE") until the sampling system (e.g., the sampling system 210) detects that the output current has achieved an approximately constant amplitude. In response, at 506, the output voltage is sampled in the first startup stage. The output voltage can increase linearly at a first output voltage slope based on the relationship of the output current, the output voltage, and the output capacitor (e.g., the output capacitor $C_O$). The sampling continues at each sample ("NEXT SAMPLE") until a predetermined last sample.

The state diagram continues for each of the startup stages until a last startup stage, such as the third startup stage 306 in the example of FIG. 7. At 508, the output current is sampled in the last startup stage. The output current can increase again based on the control of the switch system in response to a last reference voltage slope of the variable reference voltage. The sampling continues at each sample ("NEXT SAMPLE") until the sampling system detects that the output current has achieved an approximately constant amplitude. In response, at 510, the output voltage is sampled in the last startup stage. The sampling continues at each sample ("NEXT SAMPLE") until a predetermined last sample. At 512, the sampling system (e.g., the circuit evaluator 268) can calculate the capacitance of the output capacitor and the resistance of the load (e.g., the load $R_1$) based on equations associated with each of the startup stages (e.g., Equations 1-6). Therefore, the sampling system can determine if the capacitor has aged (e.g., lost capacitance), such that the system can provide an alarm and/or adjust the transfer function of the control of the respective voltage regulator system.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A voltage regulator circuit comprising:
   switch circuitry having a voltage input, a regulated output, and a switch input;
   feedback circuitry having a feedback input, a reference input, a controller input, and a driver output, the feedback input coupled to the regulated output;
   gate driver circuitry having a driver input coupled to the driver output and having a switch output coupled to the switch input; and
   controller circuitry having a controller output coupled to the controller input, the controller circuitry including sampling circuitry and evaluator circuitry, the sampling circuitry coupled to the regulated output, the evaluator circuitry configured to:
   determine a first slope of an output voltage signal at the regulated output in a first time period;
   determine a second slope of the output voltage signal in a second time period after the first time period, in which the second slope greater than the first slope; and
   determine an output capacitance based on the first and second slopes.

2. The voltage regulator circuit of claim 1 in which the feedback circuitry is configured to receive, at the reference input, a reference voltage signal that increases linearly at a third slope in the first time period and at that increases linearly at a fourth slope in the second time period, the fourth slope is greater than the third slope.

3. The voltage regulator circuit of claim 1 in which the sampling circuitry is configured to sample the output voltage signal and an output current signal at the regulated output multiple times in the first time period and multiple times in the second time period.

4. The voltage regulator circuit of claim 3 in which the feedback circuit includes:
   a compensation circuit including the feedback input, the reference input, and an error output; and
   a comparator circuit including the controller input and an error input, the error input coupled to the error output.

5. The voltage regulator circuit of claim 1 in which the evaluator circuitry is configured to update a transfer function of the voltage regulator system, the updating based on the determined output capacitance.

6. The voltage regulator circuit of claim 1 in which the evaluator circuitry is configured to provide an indicator signal responsive to a change in the output capacitance exceeding a threshold.

7. The voltage regulator circuit of claim 1 in which the evaluator circuitry is configured to calculate a first output capacitance with a first equation for the first time period and calculates a second output capacitance with a second equation for the second time period.

8. The voltage regulator circuit of claim 7 in which the first and second equations are:

$$C_{o1} \cdot s_{r1} = \left(I_1 - \frac{V_{o1B}}{R_L}\right) \quad \text{Equation 1}$$

$$C_{o2} \cdot s_{r2} = \left(I_2 - \frac{V_{o2B}}{R_L}\right) \quad \text{Equation 2}$$

Where:
$S_{r1} = (V_{O1B} - V_{O1A})/\Delta t_1$;

$S_{r2} = (V_{O2B} - V_{O2A})/\Delta t_2$;

Where:
$S_{r1}$ is the first slope;
$S_{r2}$ is the second slope;
$R_L$ is a load resistance;
$C_{O1}$ is the first output capacitance;
$C_{O2}$ is the second output capacitance;
$\Delta t_1$ is a first sampling duration in the first time period;
$\Delta t_2$ is a second sampling duration in the second time period;
$V_{O1a}$ is a first sampled voltage at the beginning of the first sampling duration;
$V_{O1B}$ is a last sampled voltage at the end of the first sampling duration;
$V_{O2A}$ is a first sampled voltage at the beginning of the second sampling duration;
$V_{O2B}$ is a last sampled voltage at the end of the second sampling duration;
$I_1$ is an amplitude of an output current during the first sampling duration; and
$I_2$ is the amplitude of the output current during the second sampling duration.

9. The voltage regulator circuit of claim 1 in which the evaluator circuitry is configured to:

determine a third slope of the output voltage signal in a third time period after the second time period, in which the third slope greater than the second slope; and determine the output capacitance based on the third slope.

10. A process for starting a voltage regulator comprising:

receiving a reference voltage at an input of feedback circuitry of the voltage regulator, the reference voltage having a first stage and having a second stage after the first stage, the reference voltage in the first stage having a first slope that increases linearly, the reference voltage in the second stage having a second slope that increases linearly, the second slope increasing over the first slope, the feedback circuitry producing a feedback signal that follows the reference voltage;

operating switch circuitry based on the feedback signal to regulate an output current and an output voltage, the operating including regulating the output voltage to have different output voltage slopes in the respective stages;

measuring the slopes of the output voltages in the respective stages; and calculating a change in output capacitance based on the measured slopes of the output voltages for the respective stages and calculating an output resistance and the output capacitance with capacitance equations associated with the respective stages.

11. The process of claim 10 in which measuring a slope of an output voltage includes:

sampling an output voltage across a duration of time;

determining the output voltage slope based on the sampled output voltage.

12. The process of claim 11 including updating a transfer function associated with the voltage regulator system based on the determined change in output capacitance.

13. The process of claim 11 including providing an indicator signal in response to the determined change in capacitance exceeding a predetermined threshold.

14. An integrated circuit comprising:

compensation circuitry having a regulated voltage input, having a reference voltage input, and having an error voltage output;

ramp generator circuitry having a ramp output;

comparator circuitry having a first input coupled to the error voltage output and coupled to the ramp output, having an inductor current input, and having a comparison output; and controller circuitry having an input coupled to the inductor current input, having an input coupled to the comparison output, and having a driver output, the controller circuitry including sampling circuitry and evaluator circuitry, the sampling circuitry coupled to the regulated voltage input, the evaluator circuitry configured to:

determine a first slope of an output voltage signal at a regulated voltage output in a first time period;

determine a second slope of the output voltage signal in a second time period after the first time period, in which the second slope greater than the first slope; and determine an output capacitance based on the first and second slopes.

15. The integrated circuit of claim 14 including a first amplifier having an input coupled to the inductor current input and having a first amplifier output coupled to the first input of the comparator circuitry.

16. The integrated circuit of claim 15 including:

a second amplifier having an input coupled to the inductor current input and having a second amplifier output; and a third amplifier having an input coupled to the regulated voltage input and to the second amplifier output, and having a third amplifier output coupled to the second input of the comparator circuitry.

17. The integrated circuit of claim 14 in which the sampling circuitry includes an alarm output.

* * * * *